(12) United States Patent
Moore

(10) Patent No.: US 8,052,140 B2
(45) Date of Patent: Nov. 8, 2011

(54) ADJUSTABLE FEEDER/DELIVERY BOARD FOR PRINTING PRESS

(76) Inventor: James L. Moore, Taylor, MI (US)

( * ) Notice: Subject to any disclaimer, the term of this patent is extended or adjusted under 35 U.S.C. 154(b) by 82 days.

(21) Appl. No.: 12/279,799

(22) PCT Filed: Feb. 16, 2007

(86) PCT No.: PCT/US2007/004305
§ 371 (c)(1),
(2), (4) Date: Jul. 14, 2010

(87) PCT Pub. No.: WO2007/098125
PCT Pub. Date: Aug. 30, 2007

(65) Prior Publication Data
US 2010/0294178 A1 Nov. 25, 2010

Related U.S. Application Data

(63) Continuation-in-part of application No. 11/721,452, filed on Jun. 12, 2007.

(60) Provisional application No. 60/774,703, filed on Feb. 17, 2006.

(51) Int. Cl.
*B65H 1/08* (2006.01)
(52) U.S. Cl. .......................................... 271/147; 271/148
(58) Field of Classification Search ............... 271/145, 271/147, 148, 157, 160, 162, 163, 171, 207, 271/213, 220, 223; 101/474, 407.1, 240; 108/50.01, 53.1
See application file for complete search history.

(56) References Cited

U.S. PATENT DOCUMENTS

| | | | |
|---|---|---|---|
| 2,471,066 A | 5/1949 | Hesson | |
| 2,833,540 A * | 5/1958 | Koch | 271/157 |
| 4,635,924 A | 1/1987 | Pollich | |
| 4,765,606 A | 8/1988 | Marass | |
| 4,811,939 A | 3/1989 | Keith | |
| 4,971,311 A | 11/1990 | Tsukimoto | |
| 5,615,875 A | 4/1997 | Greive et al. | |
| 5,813,670 A * | 9/1998 | Maass | 271/157 |
| 6,629,693 B2 | 10/2003 | Siow et al. | |
| 7,448,614 B2 * | 11/2008 | Koga | 271/171 |
| 2003/0102623 A1 | 6/2003 | Hirai et al. | |
| 2007/0182085 A1* | 8/2007 | Nakashima et al. | 271/126 |
| 2008/0067733 A1* | 3/2008 | Iwakiri | 271/145 |

* cited by examiner

*Primary Examiner* — David H Bollinger
(74) *Attorney, Agent, or Firm* — Fraser Clemens Martin & Miller LLC; William J. Clemens

(57) ABSTRACT

A feeder/delivery board (81) includes a generally planar platform (83) made of a flexible material, and a plurality of legs (84) attached to the platform and extending downwardly for supporting the board on a printing press table (80a). A jack mechanism (88) is mounted in at least one of the legs (84) for selectively raising an area of the platform (83) relative to a remainder of the platform. The jack mechanism (88) includes a rack (89), a pinion (90) engaging the rack and a key (91) or thumbwheel (71) for rotating said pinion. The board (81) can include one of the jack mechanisms (88) mounted in each of the legs (84).

6 Claims, 10 Drawing Sheets

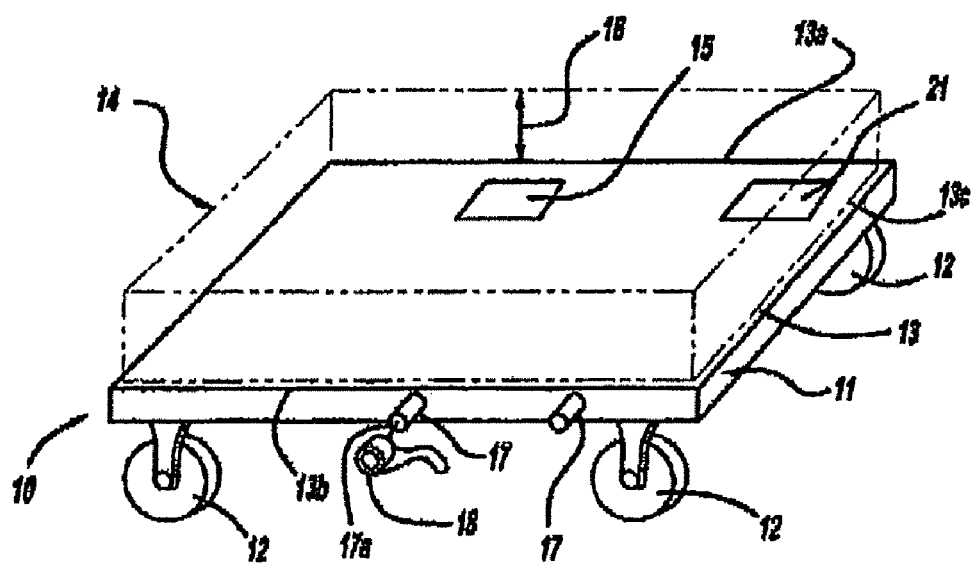
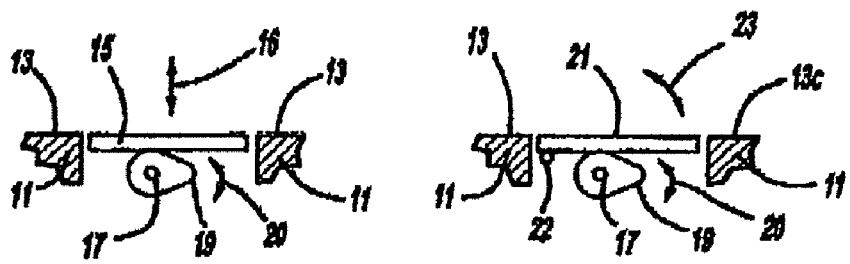
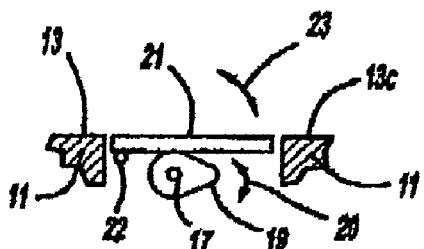

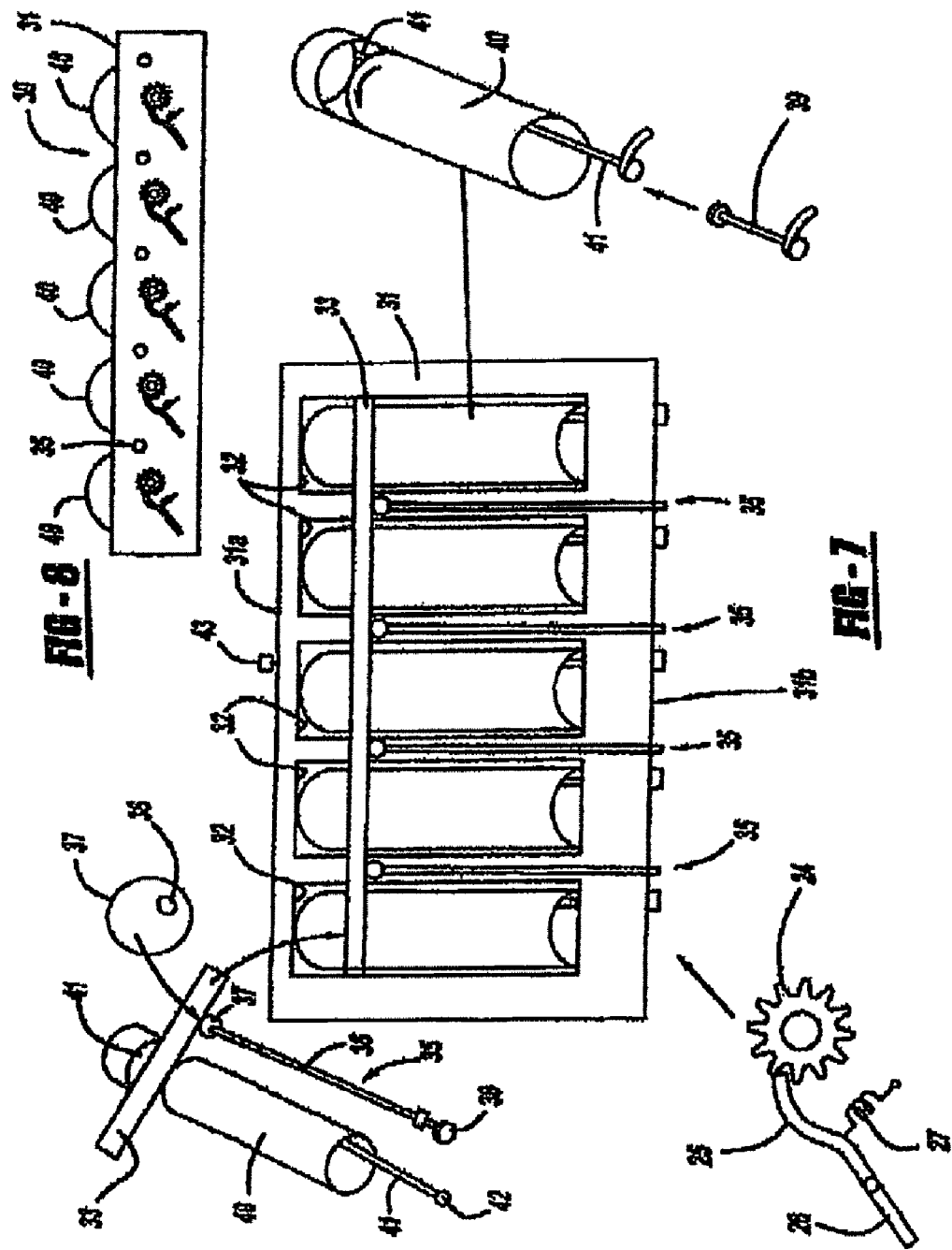

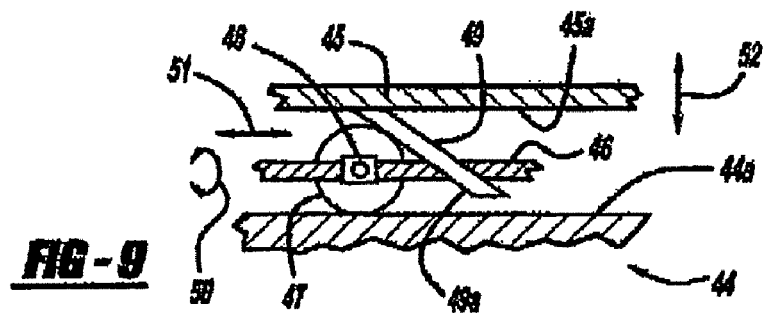
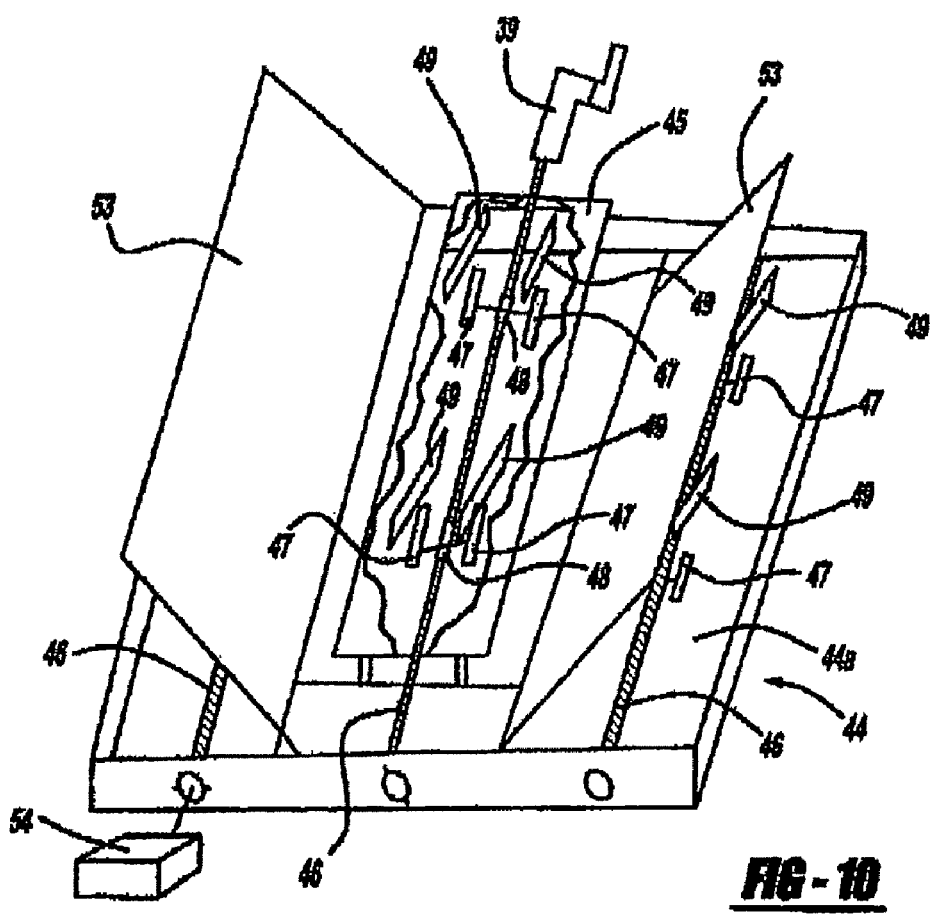

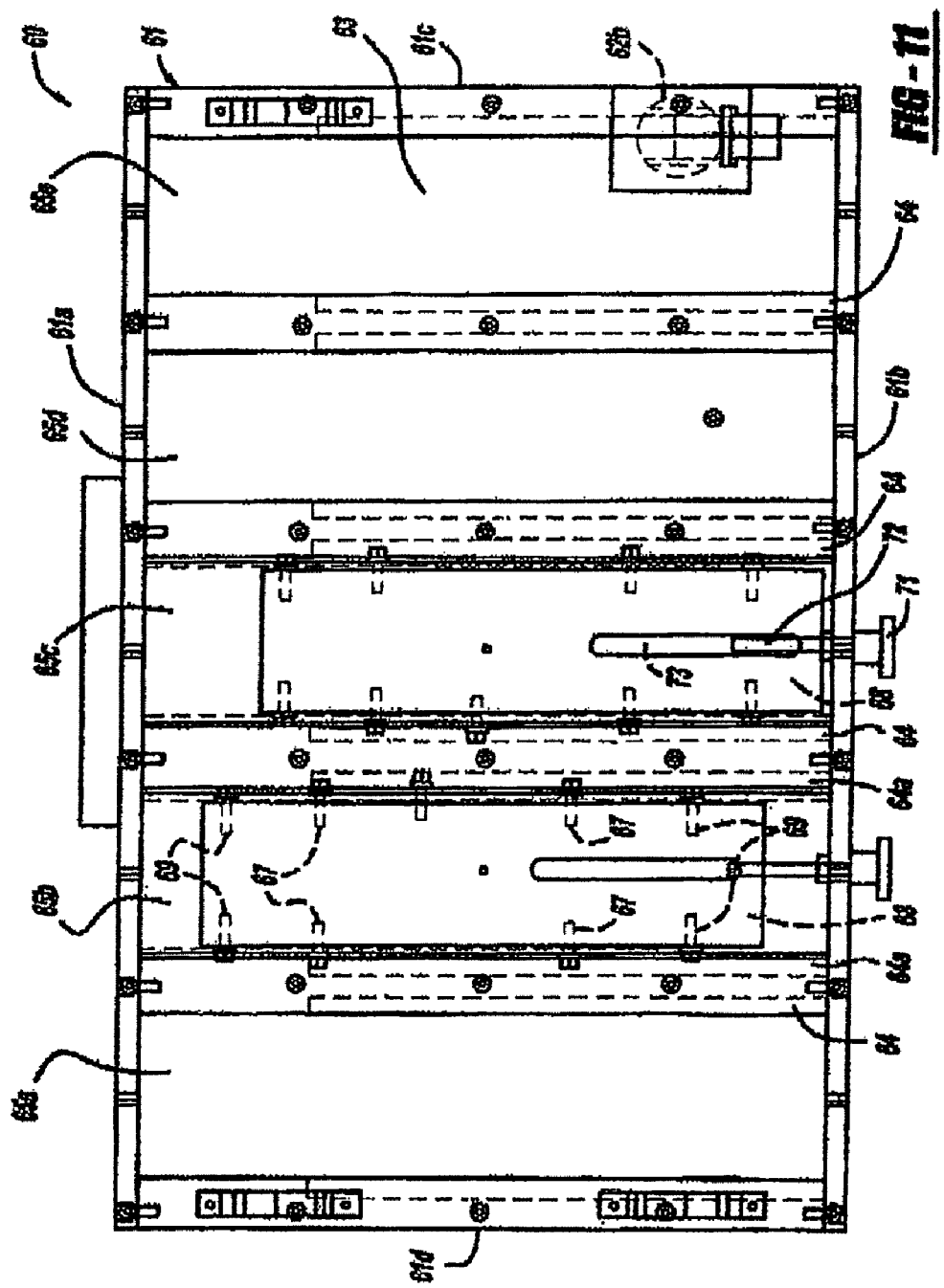

ADJUSTABLE FEEDER/DELIVERY BOARD FOR PRINTING PRESS

CROSS-REFERENCE TO RELATED APPLICATION

This application claims the benefit of U.S. provisional patent application Ser. No. 60/774,703 filed Feb. 17, 2006.

FIELD OF THE INVENTION

The present invention relates to a device for receiving sheet piles thereon for use in a sheet-fed printing press.

BACKGROUND OF THE INVENTION

Various devices for receiving piles of sheet paper thereon have become known heretofore in the prior art. Such devices serve for making-ready for the sheet-fed press paper sheets which are to be printed. When the board provided with the pile is moved upwardly as required for this purpose, the pile of sheets resting thereon is guided by a pile guide, so that the individual sheets of paper in the pile will be in a correct position for feeding into the press.

U.S. Pat. No. 4,635,924 entitled "Sheet Feeder for a Sheet-Processing Machine". A sheet feeder for a sheet-processing machine having a device for automatically aligning a lateral position of a stack of sheets from which respective sheets to be individually separated are detectable by a conveyor device for transporting the sheets in a given transport direction and feedable to the sheet-processing machine, includes a stack table for carrying the stack of sheets, the stack table being movable transversely to the given transport direction of the sheets, servomotor means for moving the stack table transversely to the given transport direction in response to respective control signals from an actual sheet-position detection device disposed immediately downstream of the sheet stack as viewed in the given transport direction, the detection device having means for detecting the lateral position of the respective sheet just separated from the stack and already fed to the conveyor device.

U.S. Pat. No. 4,765,606 entitled "Sheet Feeder". In the context of a sheet feeder comprising a stack carrying table able to be moved by a lifting device and having front and side abutments, precise positioning of the stack is facilitated in as far as the stack carrying table is composed of a supporting table adapted to be connected with a lifting member of the lifting device and of a loading stage supported on the carrying table for free movement in its own plane in substantially all directions within the plane. The sheet feeder furthermore has a clamping device which is able to detachably clamp the stage to the supporting table.

U.S. Pat. No. 4,811,939 entitled "Printing Platform". A platform for supporting paper and/or cardboard which is to be supplied to a printing press wherein the sheets of paper are stacked on a inner table which is mounted in an outer table for adjustable movement and wherein the outer table is driven vertically so as to lift and automatically feed the paper to a printing press or other machine and wherein the paper can be aligned in a first direction by jogging it against bars fixed to the printing press to align first edges and wherein a sensor senses the lateral position of the upper edges of the sheets of paper and controls an adjusting motor which adjusts the position of the inner table so that the lateral position of the upper sheets being fed to the printing press or at the proper position.

U.S. Pat. No. 4,971,311 entitled "Feeder for Sheet-Feed Printing Machine". A feeder for use in a sheet-feed printing machine, in which, while a pile board loaded with a paper sheet pile on a pallet is moved upward, paper sheets are fed to the printing unit through a side register lay, comprising a sensor movable along a threaded shaft according to the rotation of the threaded shaft to detect a side edge of the paper sheet pile, which is moved an amount equal to the distance in the cross or lateral direction between a position at which the paper sheet pile is to be positioned when a left-pulling side register lay is used and a position at which the paper sheet pile is to be positioned when a right-pulling side register lay is used, and further comprising a non-interrupting paper replenishing device to insert another paper sheet pile under the paper sheet pile, or detecting means to detect the remaining amount of paper sheets and the top surface of the paper sheet pile.

U.S. Pat. No. 5,615,875 entitled "Device for Receiving Sheet Piles Thereon in a Sheet-Fed Printing Press". In a sheet-fed printing press, there is provided a device for receiving sheet piles thereon, including a pile table movable up and down, spacers disposed on the pile table, and pile supports of respective sizes corresponding to respective sizes or formats of the sheets disposable on the pile supports, the spacers being distributed over and locally fixed to the pile table so that the respective pile supports of varying sizes rests on a selected number of spacers sufficient for safely supporting the respective pile supports against tilting, the pile supports of respectively smaller size resting on a smaller number of the respective spacers than the pile supports of respectively larger size.

A common problem is that the sheets may not lie flat on the board thereby causing an alignment problem during feeding into the printing press. It has become known from the prior art to interpose spacers between the bottom sheet in the pile and the upper surface of the board to offset sheet curvature problems. These spaces are wedge-shaped, i.e. have the shape of angles in profile, and are displaceably disposed on the board. Problems with such spacers are that several are required correct a curvature that extends between opposite edges of the sheets and such spacers typically do not extend to the central portion of the pile.

SUMMARY OF THE INVENTION

The present invention concerns an apparatus for supporting a stack of sheets of material such as printing paper to be used in a printing press. The apparatus is a feeder/delivery board including: a platform having an upper surface extending in a plane for supporting the stack of sheets; at least one movable adjustment portion formed in the upper surface; and an actuating mechanism for selectively moving the at least one movable adjustment portion relative to the plane whereby an area of the stack of sheets being supported by said at least one moveable adjustment portion can be moved vertically relative to a remainder of the stack of sheets. The board has a plurality of support assemblies attached to the platform for supporting the board on a surface. The support assemblies can be wheel assemblies and/or leg assemblies.

The actuating mechanism includes a threaded rod connected to one of a cam, a pinion, a nut and a plate for moving the movable adjustment portion. A handle, wheel or knob can be used to manually rotate the rod, or a powered actuator such as an electric, hydraulic and pneumatic actuator can be used.

The movable adjustment portion can be substantially planar or shaped such as cylindrical. The movable adjustment portion can have an edge hinged to the platform.

In a preferred embodiment, the platform has a front wall and a spaced apart rear wall joined by an opposed pair of side walls. A plurality of the movable adjustment portions extend between the front wall and the rear wall side-by-side. The actuating mechanism moves the moveable adjustment portions in a vertical direction. The actuating mechanism includes a plurality of rollers engaging angled slots in the moveable adjustment portions whereby movement of the actuating mechanism relative to the rear wall moves the rollers in the slots causing the movable adjustment portions to move in a vertical direction relative to the plane. The actuating mechanism includes a rod threadably engaging an aperture formed in a plate connected to the rollers and one of the manual actuating means and the powered actuating means for rotating the rod.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a feeder/delivery board apparatus in accordance with the present invention;

FIG. 2 is a fragmentary cross-sectional view of one adjustment portion shown in FIG. 1;

FIG. 3 is fragmentary cross-sectional view of another adjustment portion shown in FIG. 1;

FIG. 7 is a top plan view of an alternate embodiment feeder/delivery board apparatus according to the present invention;

FIG. 8 is a rear elevation view of the apparatus shown in FIG. 7;

FIG. 9 is a fragmentary cross-sectional view of another adjustment mechanism according to the present invention;

FIG. 10 is a perspective view of the feeder/delivery board and adjustment mechanism shown in FIG. 9;

FIG. 11 is a top plan view of a further alternate embodiment feeder/delivery board apparatus according to the present invention;

DESCRIPTION OF THE PREFERRED EMBODIMENT

Figure 4:
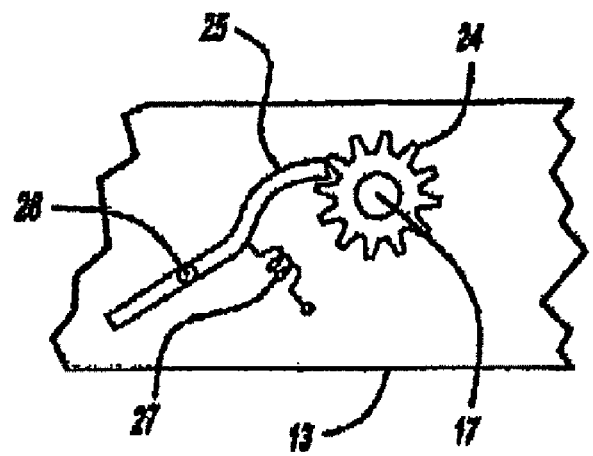
FIG. 4 is a fragmentary elevation view of a ratchet mechanism of one adjustment mechanism used with the apparatus shown in FIG. 1.

The U.S. provisional patent application Ser. No. 60/774,703 filed Feb. 17, 2006 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

There is shown in FIG. 1 a feeder/delivery board 10 according to the present invention for use with a printing press (not shown) as a paper delivery board and/or a paper feeder board. The board 10 includes a planar platform 11 having a plurality of support assemblies 12, such as wheel assemblies, extending from a bottom surface thereof. An upper surface 13 of the platform 11 extends in a generally horizontal plane for supporting a stack 14 of sheets of paper shown in phantom line. An adjustment portion 15 of the upper surface 13 is vertically moveable up and down in a direction of a double-headed arrow 16. The adjustment portion 15 is positioned adjacent a central area of a forward edge 13a (facing the not shown printing press) of the surface 13. Art actuating mechanism includes an actuating rod or axle 17 having an exposed end 17a that extends outwardly adjacent a rearward edge 13b of the upper surface 13 to accept a removable crank handle 18. The axle 17 is mechanically connected to the adjustment portion 15 to cause movement in the direction of the arrow 16 thereby adjusting the height of that portion of the stack 14 supported by the adjustment portion 15. Although the end 17a is shown as extending outwardly adjacent the rearward edge 13b; the end 17a can extend outwardly adjacent the forward edge 13a, and the end 17a can be recessed at either edge to prevent interference with the printing press.

The adjustment portion 15 is simply representative of any number of sizes, shapes, locations, adjustment movements and actuating mechanisms for such adjustment portions as required to level the stack of sheets 14. As shown in FIG. 2, the axle 17 includes a cam 19 that contacts a lower surface of the adjustment portion 15. The axle 17 rotates in a direction of a double-headed arrow 20 to move the adjustment portion 15 in the direction of the arrow 16.

As shown in FIG. 3, the axle 17 includes the cam 19 that contacts a lower surface of an adjustment portion 21. The adjustment portion 21 is attached to a pivot point 22 for rotating movement in a direction of a double-headed arrow 23. The axle 17 rotates in the direction of the double-headed arrow 20 to move the adjustment portion 21 in the direction of the arrow 23. The adjustment portion 21 is useful in a side area 13c (FIG. 1) of the surface 13.

Once positioned, the adjustment portions 15 and 21 can be held by any suitable means such as a ratchet mechanism as shown in FIG. 4. The mechanism includes a toothed wheel 24 mounted for rotation with the axle 17. A latch 25 is rotatably mounted to the platform 13 at a pivot point 26 near one end of the latch. A free end of the latch 25 engages the teeth of the wheel 24 under the urging of a return spring 27 to prevent rotation of the axle 17. Movement of the latch 25 out of engagement with the wheel 24 permits rotation of the axle 17.

Figure 5:
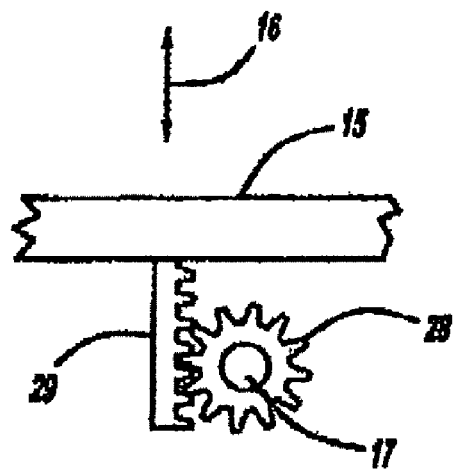
FIG. 5 is a fragmentary elevation view of another adjustment mechanism used with the apparatus shown in FIG. 1.
Figure 6:
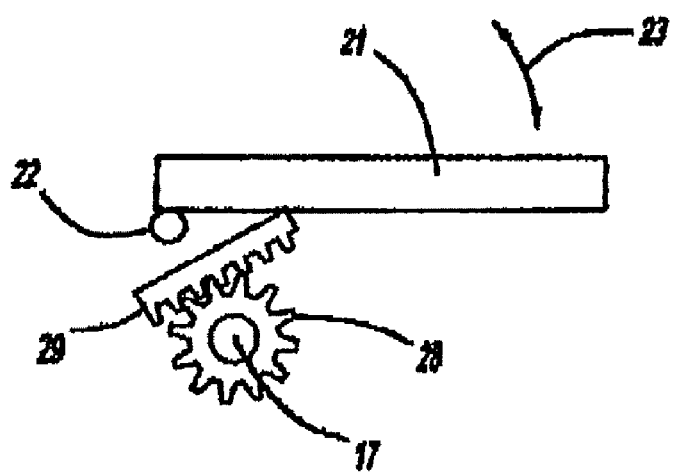
FIG. 6 is a fragmentary elevation view of another version of the adjustment mechanism shown in FIG. 5.

Another form of adjustment mechanism is shown in FIG. 5 wherein a pinion 28 is affixed to the axle 17 and engages a rack 29 attached to the adjustment portion 15 to provide the vertical movement indicated by the arrow 16. This same adjustment mechanism can be used to move the adjustment portion 21 as shown in FIG. 6 for rotational movement as indicated by the arrow 23.

An alternate embodiment of the present invention is shown in FIGS. 7 and 8. A feeder/delivery board 30 has a platform upper surface 31 with a front edge 31a and a rear edge 31b.

The upper surface 31 has a plurality of longitudinal slots 32 formed therein extending front to rear. A front lift bar 33 extends transverse to the slots 32 adjacent to the front edge 31a. A lift bar actuating mechanism 35 is provided between each pair of adjacent ones of the slots 32. The mechanisms are similar to those shown in FIGS. 1-3 and include a rod or axle 36 with a cam 37 that contacts a lower surface of the lift bar 33 and a nut 38 on an exposed free end of the axle 36 at the rear edge 31b engaged by a removable handle 39.

A tube 40 is provided in each of the slots 32 and has a recess formed therein to clear the lift bar 33. The tube 40 is attached eccentrically to a rod or axle 41 having nut 42 on an exposed free end of the axle 41 engaged by the removable handle 39. As shown in FIG. 8, each of the tubes 40 can be rotated individually to provide selected levels of height adjustment. Also, as shown in FIG. 7, an opposite end of the axle 41 can be exposed at the front edge 31a and can be provided with a nut 43 for engagement by the handle 39. Although only one of the nut 43 is shown, each of the axles 36 and 41 can be constructed in a similar manner to permit adjustments from the front and read sides of the board 30.

There is shown in FIG. 9 an alternate embodiment feeder/delivery board 44 according to the present invention. An adjustment portion 45 is spaced above a generally horizontal internal surface 44a of the board 44. A screw rod 46 extends in the space between the board surface 44a and a facing lower surface 45a of the adjustment portion. A wheel 47 (or a bearing, a roller, or the like) rolls along the surface 44a and can represent a pair of such wheels rotatably mounted on a nut 48 engaged by the screw 46. A ramp 49 is attached to the adjustment portion 45 at the lower surface 45a and extends toward the surface 44a at an angle. The ramp 49 has an engagement surface 49a that can be contacted by the wheel 47.

The screw 46 can be rotated in either direction as indicated by a double-headed arrow 50. Rotation of the screw 46 causes the nut 48 and the wheel 47 to move as indicated by a double-headed arrow 51. Such movement of the wheel 47 in contact with the engagement surface 49a causes the adjustment portion 45 to move as indicated by a double-headed arrow 52. Thus, rotation of the screw 46 in a direction to cause movement of the wheel to the right in FIG. 9 will raise the adjustment portion 45 and a supported area of a stack of paper relative to the surface 44a. Rotation of the screw 46 in the opposite direction will cause movement of the wheel 47 to the left in FIG. 9 to lower the adjustment portion 45 and the supported area of the stack of paper.

FIG. 10 is a perspective view of the feeder/delivery board 44 with the adjustment portion positioned in the center for vertical movement flanked by a pair of rotatably mounted side adjustment portions 53 actuated by the same type of adjustment mechanism as shown in FIG. 9. The screws 46 can extend from both the front and rear sides of the board 44 for engagement by the handle 39. In the alternative, an actuator 54 can be coupled to the screw 46 for rotation. The actuator 54 can be of any suitable type such as electric, hydraulic or pneumatic.

There is shown in FIGS. 11 through 14 a further embodiment feeder/delivery board 60 according to the present invention for use with a printing press (not shown) as a paper delivery board and/or a paper feeder board. The board 60 includes a planar platform 61 having support assemblies, such as three leg assemblies 62a and one wheel assembly 62b, extending from a bottom surface thereof for supporting the board 60 on a surface such as a building floor. While the legs 62a will slide on the floor, the wheel assembly 61b facilitates "steering" the board 60 during sliding movement. An upper surface 63 of the platform 61 extends in a generally horizontal plane for supporting a stack of sheets of paper such as the stack 14 shown in FIG. 1. The platform 61 is generally rectangular with a front wall 61a for facing the printing press, an opposed rear wall 61b, and a left wall 61c and a right wall 61d joining the front and rear edges.

Figure 12:
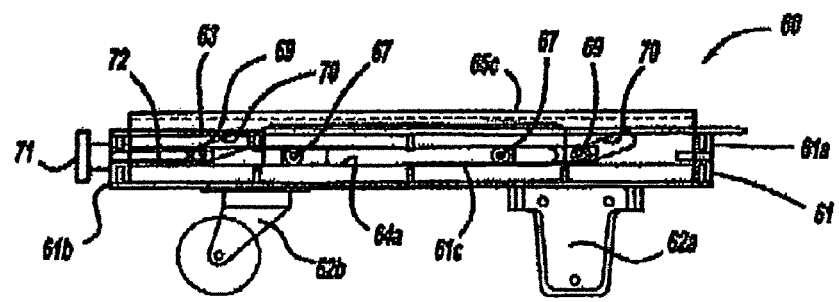
FIG. 12 is a left side elevation view of the apparatus shown in FIG. 11 with the side wall removed.
Figure 13:
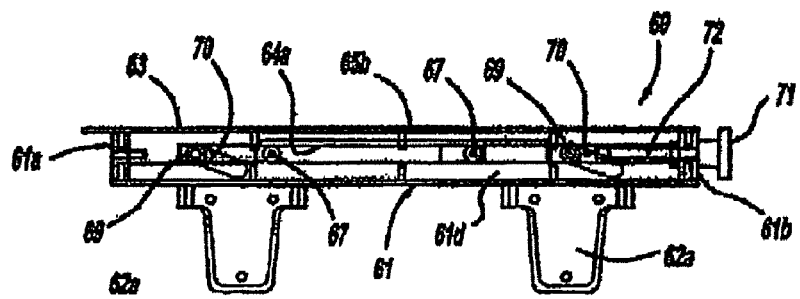
FIG. 13 is a right side elevation view of the apparatus shown in FIG. 11 with the side wall removed.
Figure 14:
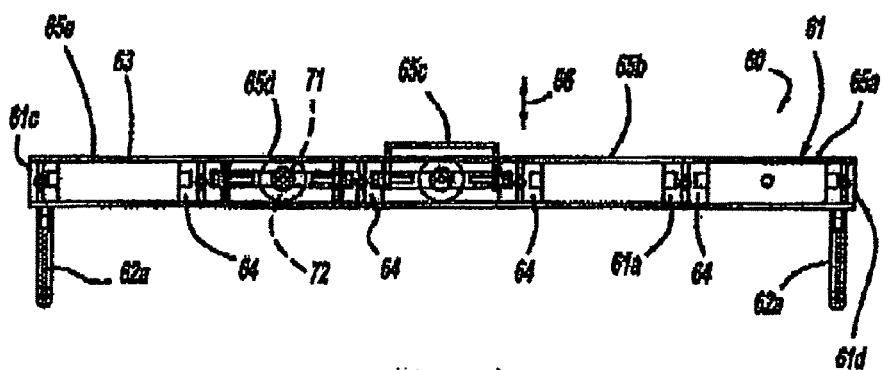
FIG. 14 is a front elevation view of the apparatus shown in FIG. 11 with the front wall removed.

The upper surface 63 includes several adjustment portions vertically moveable up and down as indicated by a double-headed arrow 66 in FIG. 14. As best shown in FIG. 11, from the right wall 61d to the left wall 61; the upper surface 63 includes adjustment portions 65a through 65e. Although five adjustment portions each extending between the front wall 61a and the rear wall 61b are shown, more or less can be provided having different shapes and sizes. In FIGS. 12 and 14, the adjustment portion 65c is shown in a raised position and the other adjustment portions are shown in the lowered position coplanar with the upper surface 63.

Only the actuating mechanisms for the adjustment portions 65b and 65c are shown in detail in the interest of clarity. A plurality of intermediate walls 64 extend between the front wall 61a and the rear wall 61b and are positioned between each adjacent pair of the adjustment portions. The walls 64 have a channel or track 64a formed in each side surface thereof in which a first plurality of inner roller assemblies 67 travels. The first roller assemblies 67 are attached to an actuating plate 68. When the plate 68 is in the position shown under the adjustment portion 65b, midway between the front wall 61a and the rear wall 61b, the adjustment portion 65b is in the lowered position. When the plate 68 is in the position shown under the adjustment portion 65c, adjacent the rear wall 61b, the adjustment portion 65c is in the raised position.

A second plurality of outer roller assemblies 69 is attached to each of the plates 68 and each outer roller assembly travels in a corresponding slot 70 formed in the adjustment portions 65a through 65e. The slots 70 extend at an angle in a vertical plane being higher toward the front wall 61a and lower toward the rear wall 61b. Thus, as the plate 68 moves from the position shown under adjustment portion 65b (FIG. 13) to the position shown under adjustment portion 65c (FIG. 12), the outer rollers 69 are moved in the slots 70 to cause the associated adjustment portion to extend upwardly. Movement of the plate 68 in the opposite direction causes the associated adjustment portion to lower.

A manual actuating means such as a handle, wheel or knob 71 is attached to an outer end of a threaded rod 72. The rod 72 threadably engages a threaded aperture 73 in the plate 68. Rotation of the knob 71 in one direction moves the plate 68 toward the rear wall 61b, and rotation in the opposite direction moves the plate 68 toward the front wall 61a. Each of the plates 68 can be provided with an associated one of the knob 71 and the rod 72, or the knob can be moved from rod to rod, or a single knob and rod can be moved from plate to plate. The adjustment portions 65a through 65e can be maintained at any position from fully lowered to fully extended and in between. The threaded engagement of the rod 72 with the aperture 73 can provide enough resistance to support the weight of the stack of sheets resting on the adjustment portion, or some form of locking mechanism can be used such as the wheel 24 and the latch 25 shown in FIG. 4.

In the alternative, the knob 71 can be replaced by a powered actuating means such as the actuator 54 (FIG. 10) which rotates the rod 72. The actuator 54 can be of any suitable type such as an electric, a hydraulic or a pneumatic motor.

Figure 15:
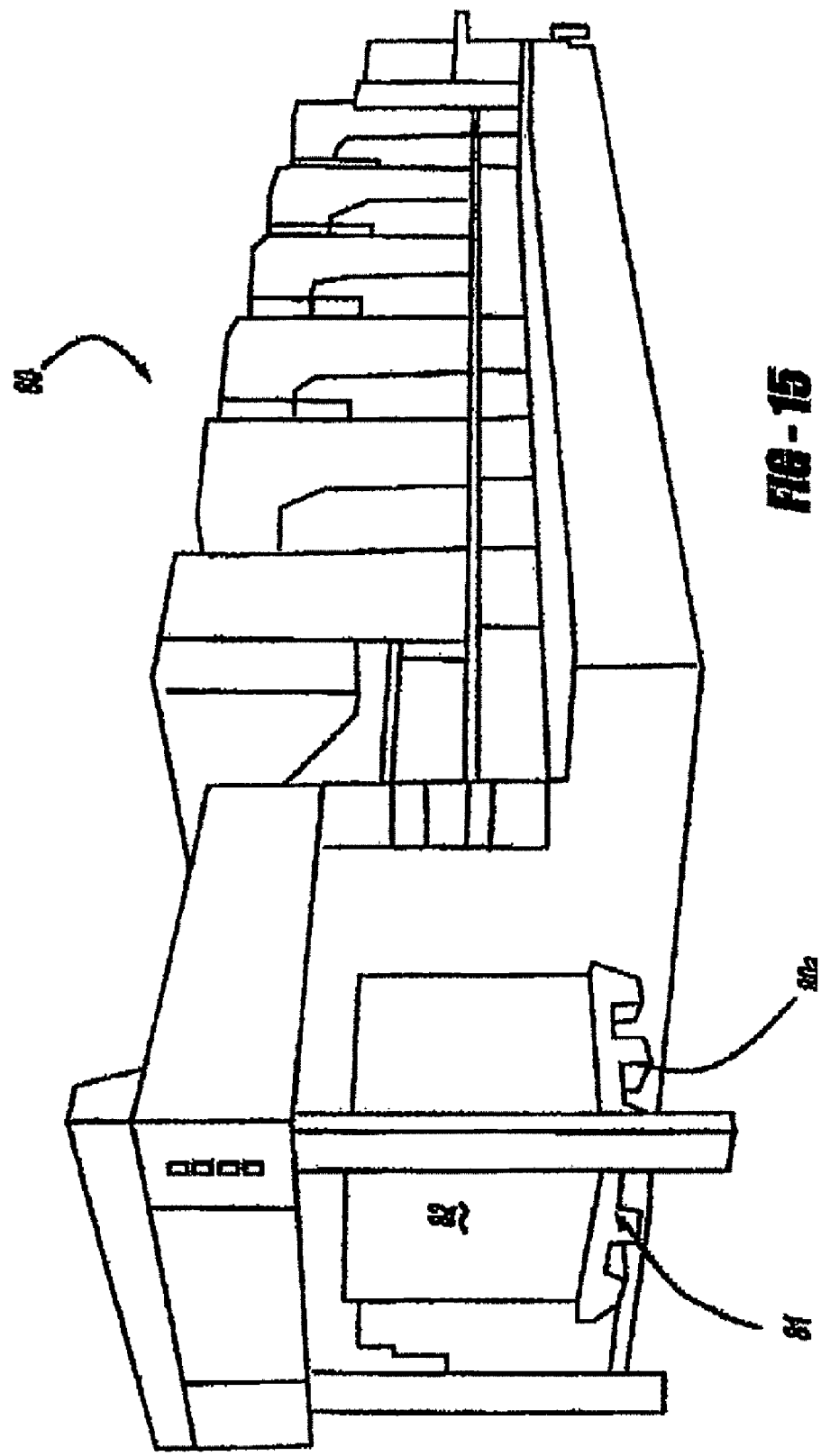
FIG. 15 is a perspective view of a printing press with another embodiment of a feeder/delivery board according to the present invention.
Figure 16:
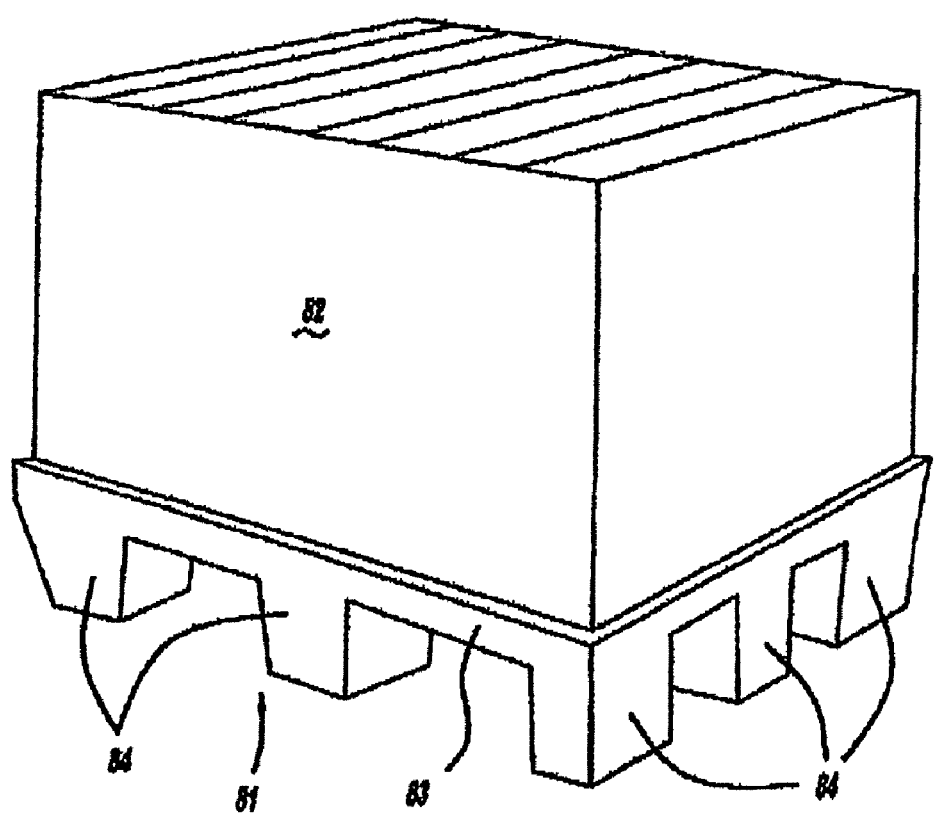
FIG. 16 an enlarged perspective view of the board supporting a stack of paper shown in FIG. 15.
Figure 17:
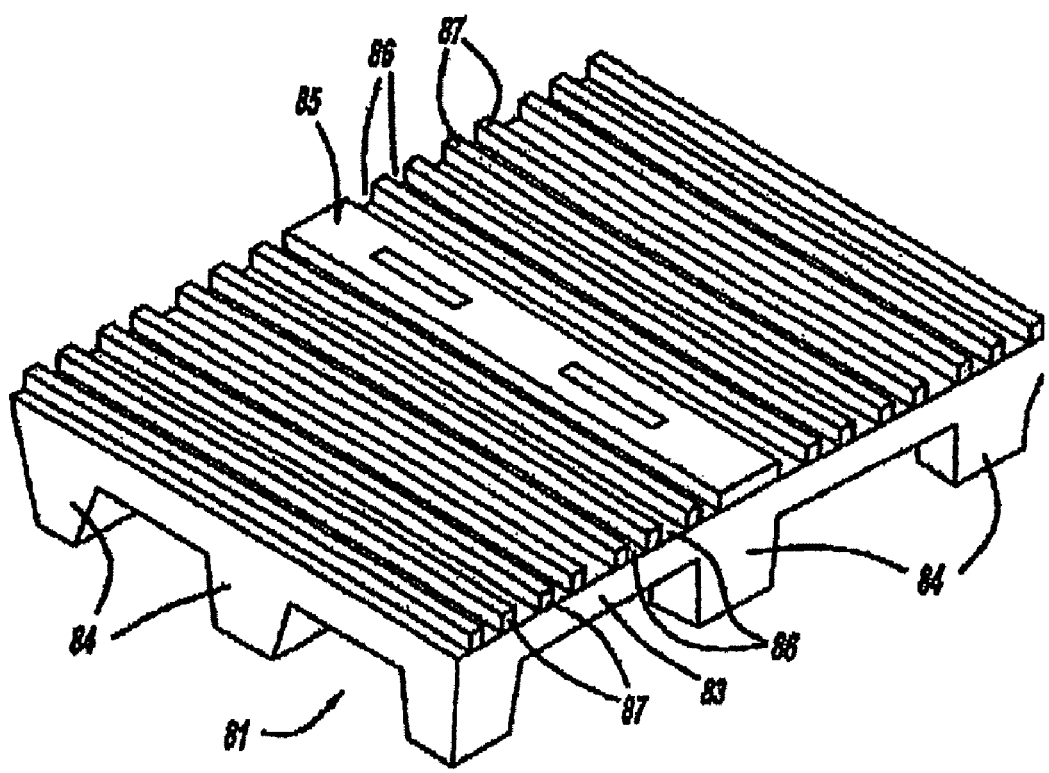
FIG. 17 is a perspective view of the board shown in FIG. 16.

There is shown in FIGS. 15-18 another embodiment of a feeder/delivery board 81 according to the present invention. A conventional printing press 80 is shown, in FIG. 15 with the feeder/delivery board 81 supporting a stack 82 of paper to be printed. The board 81 is also commonly known as a skid or a pallet. The board 81 rests on a table 80a that is raised as the paper is supplied to the printing press 80. As shown in FIGS. 16 and 17, the board 81 has a substantially planar platform 83 that supports the paper stack 82 on an upper surface 85. A plurality of legs 84 extends downwardly from a lower surface of the platform 83 to engage the table 80a (FIG. 15).

Conventional feeder/delivery boards that look like the board 81 are typically made from a strong plastic material that resists deflection of the board under load. Such boards have a plurality of grooves or channels 86 alternating with a plurality of ribs 87 at the upper surface 85 extending in parallel relationship between front and rear edges of the upper surface. The grooves 86 can accept supports or lifting devices (not shown) for the load. See, for example, U.S. Pat. No. 6,705,236. Furthermore, wedges (not shown) can be inserted between the bottom of any of the legs 84 and the table 80a to tilt the board 81.

Figure 18:
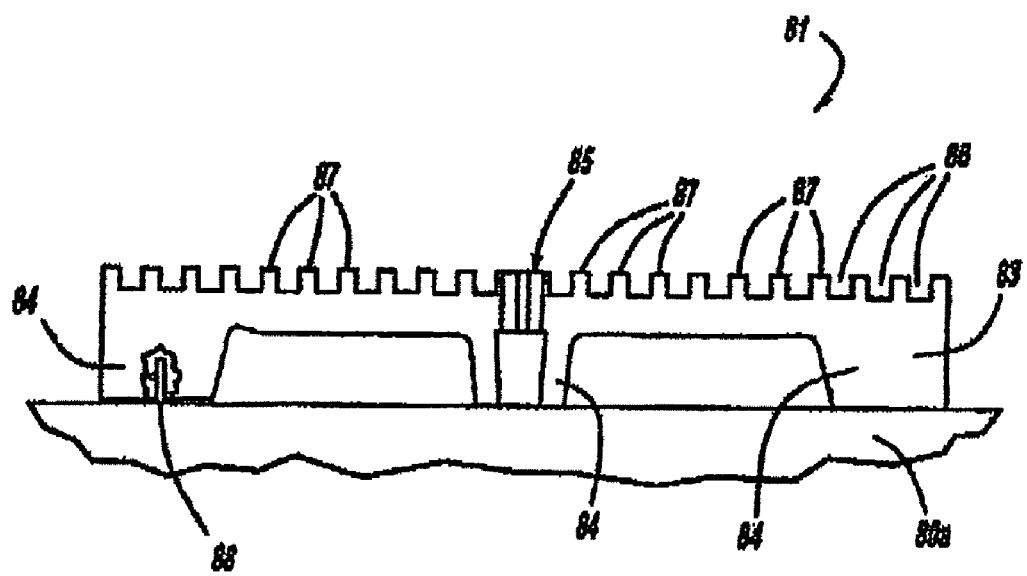
FIG. 18 is a side elevation view of the board shown in FIG. 17.

Although the feeder/delivery board 81 looks like the conventional boards, it is constructed so that the platform 83 is somewhat flexible. This enables selected areas of the platform 83 to be raised without tilting the entire board 81. As shown in FIG. 18, a left one of the legs 84 is raised above the upper support surface of the table 80a by a jack mechanism 88. The flexible properties of the platform 83 permit it to bend in the area of the left leg 84 without disturbing the remainder of the platform. By providing each of the legs 84 with one of the jack mechanisms 88, a load such as the stack 82 of paper can be leveled for feeding into the press 80.

Figure 19:
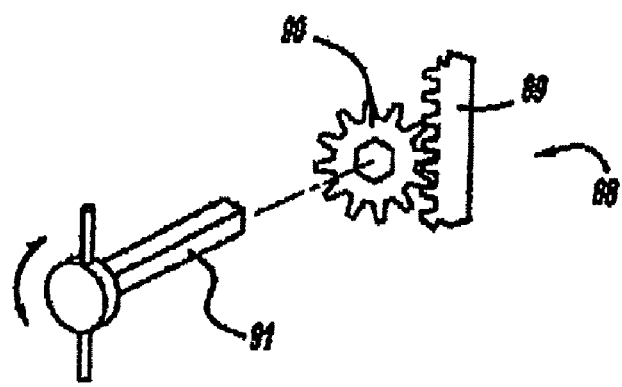
FIG. 19 is an elevation view of the jack mechanism shown in FIG. 18.

The jack mechanism 88 can be of any suitable construction. As shown in FIG. 19, the jack mechanism can be a vertical rack 89 driven by a pinion 90 rotated by a removable key 91. As an alternative, the pinion can be rotated by a thumbwheel (not shown) partially exposed at the side of the leg 84 for actuation.

While the feeder/delivery board of the present invention has been described in relation to a printing press and a stack of sheets of paper, the board can be used with any stack of sheets of material that require leveling before processing.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A feeder/delivery board comprising;
    a generally planar platform made of a flexible material;
    a plurality of legs attached to said platform and extending downwardly for supporting the board on a printing press table; and
    a jack mechanism mounted in at least one of said legs for selectively raising an area of said platform relative to a remainder of the platform.

2. The board according to claim 1 wherein said jack mechanism includes a rack, a pinion engaging said rack and a means for rotating said pinion.

3. The board according to claim 2 wherein said means for rotating is a key.

4. The board according to claim 2 wherein said means for rotating is a thumbwheel.

5. The board according to claim 1 including one of said jack mechanism mounted in each of said legs.

6. The board according to claim 1 wherein said platform has a plurality of grooves alternating with a plurality of ribs formed at an upper surface extending in parallel relationship between front and rear edges of said upper surface.

* * * * *